(12) United States Patent
Nakano

(10) Patent No.: US 7,323,538 B2
(45) Date of Patent: Jan. 29, 2008

(54) POLYMER HAVING UNIQUE OPTICAL PROPERTY AND POLYMERIZABLE MONOMER THEREFOR

(75) Inventor: Tamaki Nakano, Nara (JP)

(73) Assignee: Japan Science and Technology Agency, Saitama (JP)

( * ) Notice: Subject to any disclaimer, the term of this patent is extended or adjusted under 35 U.S.C. 154(b) by 351 days.

(21) Appl. No.: 10/475,981

(22) PCT Filed: Apr. 24, 2002

(86) PCT No.: PCT/JP02/04120

§ 371 (c)(1),
(2), (4) Date: Oct. 27, 2003

(87) PCT Pub. No.: WO02/088202

PCT Pub. Date: Nov. 7, 2002

(65) Prior Publication Data

US 2004/0132963 A1  Jul. 8, 2004

(30) Foreign Application Priority Data

Apr. 27, 2001 (JP) .............................. 2001-130872

(51) Int. Cl.
*C08G 65/34* (2006.01)

(52) U.S. Cl. ...................... 528/403; 528/418; 528/425; 430/138; 430/496

(58) Field of Classification Search ................ 430/138, 430/496; 528/403, 418, 425
See application file for complete search history.

(56) References Cited

FOREIGN PATENT DOCUMENTS

| EP | 773232 | 5/1997 |
|----|--------|--------|
| WO | WO 9506274 | 3/1995 |
| WO | WO 9705184 | 2/1997 |

*Primary Examiner*—Irina S Zemel
(74) *Attorney, Agent, or Firm*—Millen White Zelano & Branigan, P.C.

(57) ABSTRACT

A polymer compound having a functional group containing a cyclic part with aromatic properties comprising C, H and/or C, H, X (X is a hetero atom) in the side-chain, and a number average molecular weight of 250-1,000,000. The molar optical absorption due to the cyclic part with aromatic properties of the polymer compound is lower 30% or more than the molar optical absorption due to the cyclic part with aromatic properties in a polymerizing monomer used to introduce the cyclic part with aromatic properties. As this cyclic part has an overlapping stack structure, the compound has a hypochromic effect, and if an electron donor compound or electron-accepting compound is added, a charge transfer complex is formed.

15 Claims, 2 Drawing Sheets

Fig 1.

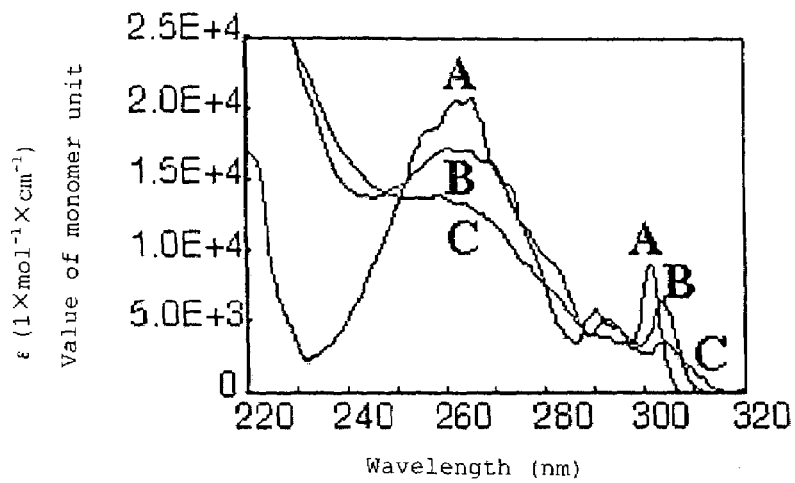

Absorption spectrum of fluorene (A), debenzofulvene oligomer (dimer (B) and mixture of trimer-homopolymer consisting of 17 monomeric units (C)) in THF at room temperature (approx. 23°C).

Fig 2.

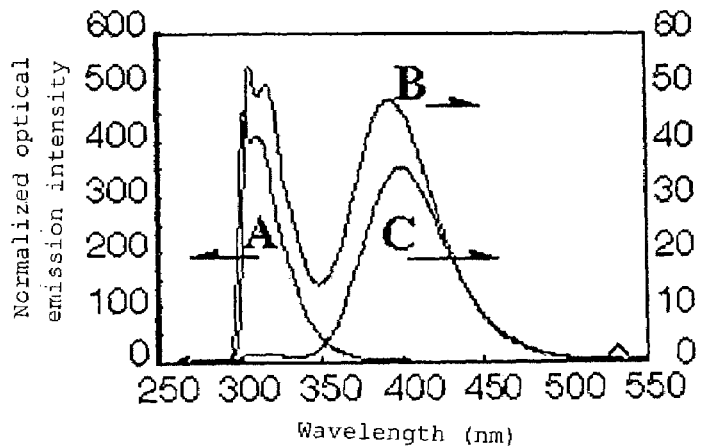

Emission spectrum of fluorene (A), debenzofulvene oligomer (dimer (B) and mixture of trimer-homopolymer consisting of 17 monomeric units (C)) in THF at room temperature (approx. 23°C). Absorption intensity is normalized to a concentration of $1.0 \times 10^{-5}$ M (excitation wavelength is 265nm (A), 267nm (B, C)).

POLYMER HAVING UNIQUE OPTICAL PROPERTY AND POLYMERIZABLE MONOMER THEREFOR

FIELD OF THE INVENTION

This invention relates to a novel polymer compound and monomer used to synthesize this polymer compound, in particular to a novel polymer compound having a functional group containing a cyclic part with aromatic properties (abbreviated as aromatic ring) comprising C, H and/or C, H, X (X is a hetero atom) in the side-chain, having a stack structure and a hyporchromic effect, and which permits a highly efficient excimer emission. It further relates to a composition containing this polymer compound, and to a polymerizing compound used to synthesize this polymer compound.

BACKGROUND OF THE INVENTION

As disclosed in William Rhodea, JACS, 83, 3690 (1961), it is known that heterocyclic rings forming DNA bases strongly absorb ultraviolet light (vicinity of 260 mm), and a hypochromic effect occurs wherein, due to the overlapping of the heterocyclic rings of the bases inside the double helix (stack structure), the optical absorption decreases. However, it is difficult to synthesize these types of polymer materials, and it is also difficult to control their optical properties. For example, as disclosed in Japanese Patent No. 2659245, a polymer wherein the side-chain is a functional group comprising an aromatic ring may be obtained by polymerizing a methacrylic acid ester having a triphenylmethyl group as the ester group. However, in this case, the aromatic rings in the functional group of the side-chain are not parallel and it is difficult to obtain a structure wherein they sufficiently overlap, so it was difficult to manifest optical properties.

As described in Yokoyama, M. Macromolecules, 8 (1975), 101 and Itaya, A, Chem. Phys. Lett. 138 (1987), 231, poly(N-vinylcarbazole) is a polymer wherein the side-chain is a functional group comprising an aromatic ring, and when it is present as a film, it is known to emit a blue light due to a carbazole excimer. However, as the functional group in the side-chain of this polymer cannot assume a stable stack structure, efficient excimer light emission does not occur.

As described in Nakano, Preliminary reports of the 48th Annual Meeting of the Society of Polymer Science, Japan (Polymer Preprints, Japan, 48(7), 1279(1999)), it is known that dibenzofulvene polymerizes, but as the polymer obtained has poor solubility and miscibility with other polymers, its detailed optical properties were not known.

The inventor therefore studied the optical properties of polymers comprising dibenzofulvene. As a result, he discovered that polymers obtained using dibenzofulvene having a substituent group had improved solubility; certain of these polymer compounds having a group containing certain aromatic rings in the side-chain had specific optical properties suggesting application as an ultraviolet transmitting material, electroluminescent material or laser material; and compositions wherein an electron acceptor compound or electron donor compound was added to these polymer compounds could be used as charge transfer materials. He thereby arrived at the present invention.

It is therefore a first object of the present invention to provide a polymer compound having a stable stack structure, showing a large hypochromic effect and which can be used as a light-resistant polymer material or ultraviolet transmitting material.

It is a second object of the invention to provide a composition containing a polymer compound having specific optical properties exhibiting highly efficient excimer light emission, emitting light from the ultraviolet region into the blue region, and which has application as an electroluminescent material or laser-emitting material.

It is a third object of the invention to provide a charge transfer material having a high charge mobility.

It is a fourth object of the invention to provide a polymerizing monomer to be used as a starting material for the aforesaid polymer compound.

SUMMARY OF THE INVENTION

The aforesaid objects of the invention are achieved by a polymer compound having special optical properties represented by the following structural formula 1, having a functional group containing an aromatic ring comprising C, H and/or C, H, and hetero atom in the side-chain, and a number average molecular weight of 250-1,000,000, wherein the molar absorption coefficient due to the aromatic ring is smaller 30% or more than the molar absorption coefficient due to the aromatic ring in the polymerizing monomer used to introduce the aromatic ring; a composition comprising at least this polymer compound, and an electron acceptor compound or electron donor compound; and the polymerizing monomer used to synthesize the aforesaid polymer compound having special optical properties represented by the following general formula (1):

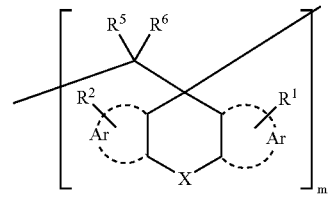

wherein, Ar is an aromatic ring, $R^1$ and $R^2$ are substituents, $R^5$ and $R^6$ are hydrogen atoms, alkyl groups, aromatic groups, a group selected from among —CN and ester groups, X is not present, or is one moiety selected from among —$CH_2$—, —$CH_2$—$CH_2$—, —CH=CH—, —C(=O)— and a hetero atom, and m is an integer equal to 2 or more.

The number average molecular weight of the polymer compound of this invention is preferably 250-10,000, but more preferably 250-5,000. The molar absorption coefficient of the polymer compound due to the aromatic ring is preferably 40% or more than the molar absorption coefficient due to the aromatic ring in the polymerizing monomer.

BRIEF DESCRIPTION OF THE DRAWINGS

FIG. 1 is an optical absorption spectrum of a polymer compound obtained in a first example. In the figure, A is the measurement for a fluorene, B is the measurement for a fluorene dimer, C is the measurement for a THF solution of the trimer-17-mer(homopolymer consisting of 17 monomeric units) of a fluorene.

FIG. 2 is the fluorescence spectrum of the polymer compound obtained in the example.

DESCRIPTION OF THE PREFERRED EMBODIMENTS

Figure 3:
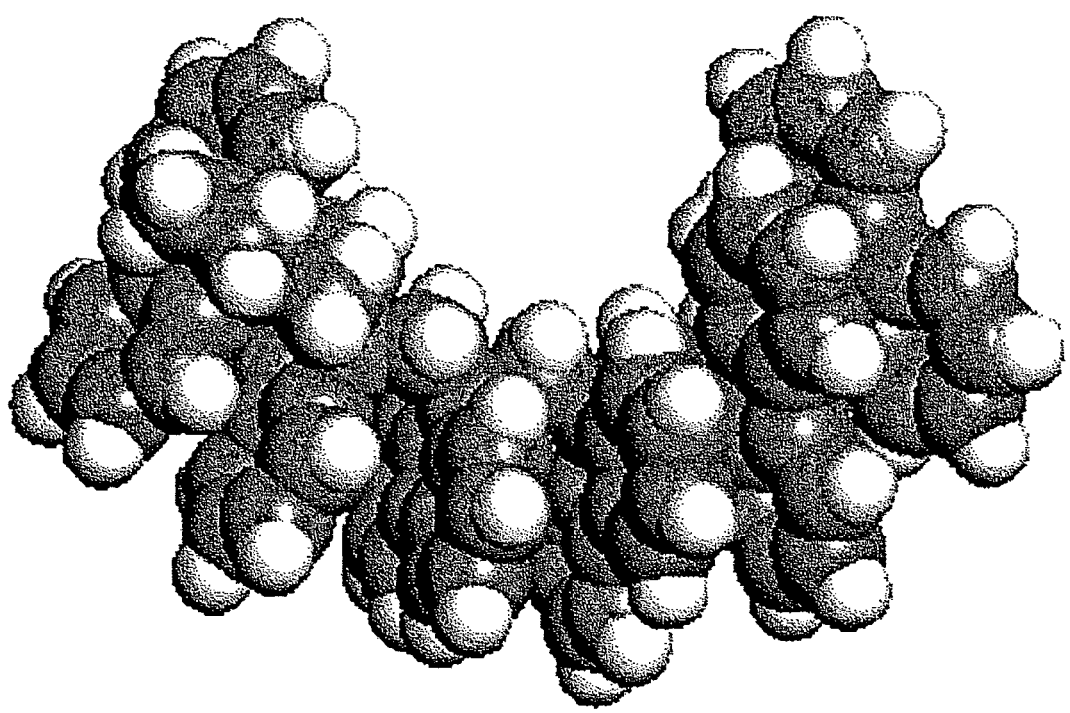
FIG. 3 is a diagram showing the single crystal structure of DBF hexamer.

The functional group containing an aromatic ring comprising C and H in this invention, is a functional group comprising one or more benzene rings such as phenyl or naphthyl, a functional group having a structure wherein an aromatic ring is attached to a cyclic hydrocarbon group such as fluorene, or a functional group wherein these aromatic rings are introduced into a substituent group. The functional group containing an aromatic ring comprising C, H and X refers to the case where an aromatic ring comprising C, H and a hetero atom is introduced instead of the aromatic ring or cyclic hydrocarbon group comprising C and H. Even if the hetero atom is an atom which directly forms part of the ring, it may be introduced as a substituent group of the ring to form a conjugated system with the ring. In this invention, an aromatic ring comprising C and H, and an aromatic ring comprising C, H and a hetero atom, may be simultaneously present. In any case, it is preferred that a stack structure comprising overlapping aromatic rings is easily assumed in the polymer state according to this invention. From the above viewpoint, a particularly preferred aromatic ring in this invention is a fluorene ring. Suitable substituent groups can be introduced into this fluorene ring. Herein, stack structure means a structure wherein the aromatic rings of the functional group of the side-chain are stacked on top of each other.

When these aromatic rings are superimposed, there is naturally a mutual interaction between two aromatic rings. This mutual interaction is stronger, the smaller the distance is between the overlapping aromatic rings, and the special optical properties of the polymer compound are correspondingly increased.

For example, in the case of aromatic rings having a planar structure, if the inter-plane distance is 0.5 nm or less, there is a strong mutual interaction between the electrons of the two rings. If it is more than 0.5 nm, energy transfer between the aromatic rings and the efficiency of electron transfer are poorer. Therefore, the inter-plane distance between the aromatic rings in the polymer compound of this invention is preferably 0.5 nm or less.

The inter-plane distance of the aromatic rings also depends on the polymerization degree of the polymer compound. In particular, from the viewpoint of conferring excimer light emission properties, the polymerization degree is preferably 4 or more. When it is less than 4, light may be emitted at an emission wavelength identical to that of the polymerizing monomer in addition to the excimer emission. Therefore, the polymer compound of this invention also contains an oligomer in addition to the ordinary polymer. Considering this polymerization degree, the molecular weight of the polymer compound of this invention must be 250-1,000,000; taking account of ease of manufacture, it is preferably 250-10,000; and taking account also of ease of handling and light emission properties of the polymer compound, it is preferably 250-5,000.

In this invention, in order to easily produce the aforesaid aromatic ring stack structure and stabilize it, or to increase the mutual interaction between aromatic rings, it is preferred to use a composition wherein an electron acceptor compound or electron donor compound is added to the polymer compound of this invention.

This electron acceptor compound means a compound with a stronger electron affinity than the polymer compound of this invention, specific examples being halogens such as $I_2$, $Br_2$, $Cl_2$, $ICl$, $ICl_3$, $IBr$ and $IF$, Lewis acids such as $BF_3$, $PF_5$, $AsF_5$, $SbF_5$, $SO_3$, $BBr_5$, $BF_4-$, $PF_6-$, $AsF_6-$, $SbF_6-$, $ClO_4-$. protonic acids such as $HNO_3$, $H_2SO_4$, $HClO_4$, $HF$, $HCl$, $FSO_3H$, $CFSO_3H$, transition metal halides such as $FeCl_3$, $MoCl_5$, $WCl_5$, $SnCl_4$, $MoF_5$, $FeOCl$, $RuF_5$, $TaBr_5$, $SnI_4$ and $LnCl_3$ (Ln=La, Ce, Pr, Nd, Sm), and 9-fluorenilidene acetonitrile, 9-fluorenilidene malonitrile, 2,4,7-trinitro-9-fluorenilidene acetonitrile, 2,4,7-trinitro-9-fluorenilidene malonitrile, o-dinitrobenzene, m-dinitrobenzene, p-dinitrobenzene, 2,4,7-trinitrobenzene, 2,4,7-trinitrotoluene, TCNQ, TCNE and DDQ.

The electron donor compound means a compound having a smaller ionization potential than that of the polymer compound of this invention, specific examples being hexamethylbenzene, alkali metals, ammonium ions and lanthanoids.

The polymerizing monomer used to obtain the polymer compound of this invention must be at least one type of polymerizing monomer containing an aromatic ring comprising C and H, or C, H and X, and if necessary a polymerizing monomer not containing the aforesaid aromatic ring may be used in conjunction therewith. The polymerizing monomer containing the aromatic ring comprising C and H, or C, H and X, is preferably a polymerizing monomer represented by the following general formula (1):

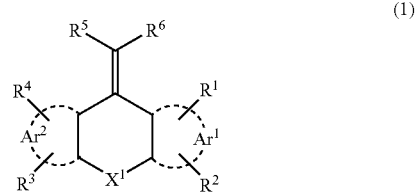

(1)

wherein, $R^1$, $R^2$, $R^3$, $R^4$ are substituent groups, for example groups selected from among hydrogen atoms, alkyl groups, —OR, aromatic groups, —NRR', —SR, halogen,

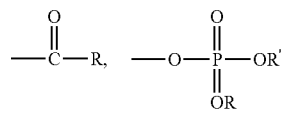

These may be identical or different, but it is preferred that all of them are not hydrogen atoms.

$X^1$ may not be present (the atoms at both ends are then directly bonded together), or is preferable one moiety selected from among —$CH_2$—, —$CH_2$, —CH=CH—, —CO—, —S—, —O—, —Si(R) (R')—, —NR— and —N(COR)—. $R^5$, $R^6$ are preferably groups selected from among hydrogen atoms, alkyl groups, aromatic groups, —CN and ester groups, and they may be identical or different. R, R' are hydrogen atoms, alkyl groups having 1-50 carbon atoms. ---$AR^1$--- and ---$AR^2$--- of the dotted portion are cyclic parts exhibiting aromatic properties, and may be heterocyclic rings containing a heteroatom $X^2$. ---$AR^1$--- and ---$AR^2$--- may also be identical or different. Examples of $X^2$ are N, O, S, Si, Ge, Sn, Pb, P, As, Sb, Bi, Se and Te, but in this invention N, O, Si, Ge are preferred, and N or O is particularly preferred.

In this invention, of the aforesaid polymerizing monomers, the compounds represented by the following structures are particularly preferred:

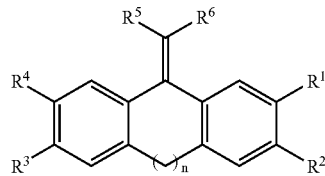

$R^1$, $R^2$, $R^3$, $R^4$ are substituent groups, for example hydrogen atoms, alkyl groups, —OR, aromatic groups, —NRR′, —SR or halogen, but it is preferred that $R^1$-$R^4$ are not all hydrogen atoms. $R^5$, $R^6$ are hydrogen atoms, straight chain alkyl groups, aromatic groups, —CN or ester groups, and n is 0, 1 or 2.

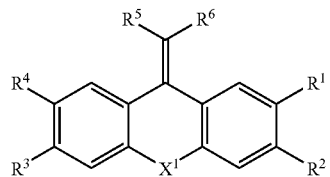

$R^1$, $R^2$, $R^3$, $R^4$ are substituent groups, for example hydrogen atoms, alkyl groups, —OR, aromatic groups, —NRR′, —SR or halogen, but it is preferred that $R^1$-$R^4$ are not all hydrogen atoms. $R^5$, $R^6$ are hydrogen atoms, straight chain alkyl groups, aromatic groups, —CN or ester groups, and n is 0, 1 or 2.

$X^1$ is —S—, —O—, —Si(R)(R′)— or —NR, and R, R′ are H or alkyl groups having 1-50 carbon atoms.

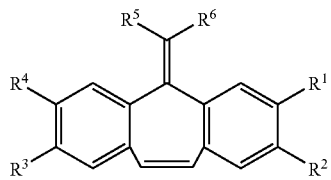

$R^1$, $R^2$, $R^3$, $R^4$ are substituent groups, for example hydrogen atoms, alkyl groups, —OR, aromatic groups, —NRR′, —SR or halogen, but it is preferred that $R^1$-$R^4$ are not all hydrogen atoms. $R^5$, $R^6$ are hydrogen atoms, straight chain alkyl groups, aromatic groups, —CN or ester groups, and n is 0, 1 or 2.

Of these, the following dibenzofulvene is particularly preferred.

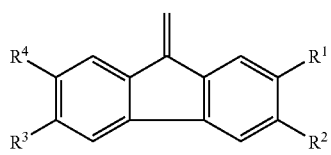

wherein, $R^1$, $R^2$, $R^3$, $R^4$ are substituent groups, for example groups selected from among hydrogen atoms, alkyl groups, —OR, aromatic groups, —NRR′, —SR, halogen,

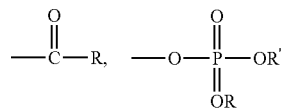

R, R′ are H or alkyl groups having 1-50 carbon atoms.

If $R^1$, $R^2$ are —$C_5H_{11}$ and $R^3$, $R^4$ are hydrogen atoms, $R^1$, $R^2$ are —$C_{12}H_{25}$ and $R^3$, $R^4$ are hydrogen atoms, $R^1$, $R^2$ are —$C_{18}H_{37}$ and $R^3$, $R^4$ are hydrogen atoms, $R^1$, $R^2$ are —C(O) $C_4H_9$ and $R^3$, $R^4$ are hydrogen atoms, or $R^1$, $R^2$ are —C(O)$C_{11}H_{23}$ and $R^3$, $R^4$ are hydrogen atoms, a polymer compound having excellent solubility is obtained, and these combinations are therefore particularly preferred.

The polymerizing monomer comprising C and H, or C, H and X, can be obtained by the method described in Bull. Chem. Soc. Jpn., 59, 97-103 (1986). Specifically, in the case where for example the aromatic ring is a fluorene ring, the fluorene derivative can be obtained by oxidizing with $CrO_3$ and reacting with the Wittig reagent.

A carbonyl group may be introduced into $R^1$, $R^2$, $R^3$, $R^4$ for example by a Friedel Crafts reaction wherein the compound obtained by reacting fluorene or a similar compound with valeroyl chloride in the presence of $AlC_{13}$ and $CS_2$ is reacted with paraformaldehyde in the presence of a base such as n-BuLi, and then reacted with t-BuOK. By this procedure, a compound wherein for example $X^1$ is not present, or is one moiety selected from among —$CH_2$—, —$CH_2$—$CH_2$— and —CH=CH—, $R^1$ is

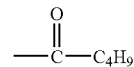

and $R^2$-$R^6$ are hydrogen atoms, or a compound wherein $R^1$ and $R^4$ are,

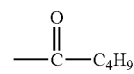

and $R^2$, $R^3$, $R^5$, $R^6$ are hydrogen atoms, is obtained.

The alkyl group may for example be introduced in a Friedel Crafts reaction wherein the compound obtained by reacting fluorene or a similar compound (hereafter, referred to as fluorenes) with valeroyl chloride in the presence of $AlCl_3$ and $CS_2$, is heated at 130° C. for 2 hours in the presence of hydrazine monohydrate and diethylene glycol. Next, the compound obtained by adding KOH and heating at 200° C. for 3 hours is oxidized by $CrO_3$, and the target compound is obtained by reacting with the Wittig reagent. In this way, a compound wherein for example $X^1$ is not present, or is one moeity selected from among —$CH_2$—, —$CH_2$—$CH_2$— and —CH=CH—, $R^1$ is —$C_5H_{11}$ and $R^2$-$R^6$ are hydrogen atoms, or a compound wherein $R^1$ and $R^4$ are —$C_5H_{11}$ and $R^2$, $R^3$, $R^5$, $R^6$ are hydrogen atoms, is obtained.

A functional group may be introduced into $R^5$, $R^6$ by for example reacting fluorenes and dibromomalonic acid esters, fluorenes and di-iodomalonic acid esters, fluorenes and dichloromalonic acid esters, fluorenes and dialkyldibromomethane or fluorenes and diaryldibromomethane with t-BuOK in an organic solvent such as dioxane in the presence of a base such as n-BuLi. Examples of groups which can be introduced by this method are alkyl groups, aromatic groups, —CN and ester groups. If at least one of $R^5$, $R^6$ is a hydrogen atom, the monomer obtained has improved stability which is preferred. Preferred combinations of $R^5$ and $R^6$ are an ester group with an ester group, a cyano group with a cyano group, an aromatic group with an aromatic group, and an alkyl group with an alkyl group. It is particularly preferred that the alkyl group is a straight chain alkyl group.

Regarding the monomer corresponding to $X^1$, suitable starting materials corresponding to $X^1$ are selected, for example in the case where $X^1$ is —$CH_2$—, di-hydroanthracene is selected as the starting material, and can easily be obtained by a similar reaction to that of fluorenes.

The polymerizing monomer thus obtained can then be polymerized by any polymerization method known in the art such as radical polymerization, anion polymerization or cation polymerization. A radical polymerization initiator is a compound which can initiate radical polymerization by light irradiation or generate radicals by heating. It is more preferred to initiate the radical polymerization by light irradiation. Examples of direct cleavage radical polymerization initiators are aryl-alkyl ketones, oxime ketones, acyl phosphine oxides, S-phenyl thiobenzoic acid and titanocene; examples of hydrogen extraction radical polymerization initiators are aromatic ketones, thioxanthone, benzyl and quinone derivatives, and ketocumarine.

Examples of complex radical polymerization initiators are organic peroxide/electron donor pigments, bis-imidazole, onium salt/electron donor pigments, N-phenylglycine/electron attracting pigments and N-phenylglycine/diphenyliodinium salt/sensitizers.

Examples of anion polymerization initiators are counter ions such as alkali metals, alkaline earth metals and ammonium, and anions such as carbon, nitrogen, oxygen and sulfur. Examples of these anion polymerization initiators are $RMgX$, $R_2Mg$, $RCaX$, $Al(C_2H_5)_3$, $LiAlH_4$, $NaR$ and $KR$ (R is an alkyl group, aralkyl group or aromatic group having 1-50 but preferably 1-20 carbon atoms such as butyl, benzyl and phenyl, and in this specification, in the above compounds, X represents halogen). An anion polymerization initiator obtained from a secondary amine represented for example by $(R^1)(R^2)NM$ ($R^1$, $R^2$ are alkyl groups, aralkyl groups or aromatic groups having 1-50 but preferably 1-20 carbon atoms, and M is a counter ion), may also be used.

The polymer of this invention can be polymerized by solid phase polymerization, liquid phase polymerization, block polymerization, emulsion polymerization, seed emulsion polymerization, suspension polymerization and dispersion polymerization.

For example, a monomer dissolved in THF is introduced into an ampule which has been vacuum dried and filled with nitrogen, and cooled to −78° C. An amount of n-BuLi equivalent to approx. 1/20 the amount of monomer is added to this solution, and reacted for 24 hours. Subsequently, the n-BuLi is inactivated with MeOH, and an equivalent amount of MeOH to that of the solution is added. The precipitate thus obtained is recovered by centrifugation, and dissolved in THF.

In this invention, at least one of the polymerizing monomers of the invention can be polymerized or copolymerized, and may also be copolymerized with other copolymerizable monomers. Examples of such other monomers are compounds having polymerizing unsaturated bonds such as R—C=C—R' or R—C≡C—R' (R, R': organic groups), compounds having vinyl groups such as (meth)acryloyl groups, and other compounds having radical polymerization initiating double bonds.

Specific examples of compounds having a (meth)acryloyl radical as vinyl group are (meth)acrylic acid; and (meth) acrylic acid alkyl esters such as ethyl acrylate ester, (meth) acrylic acid n-propyl ester, (meth)acrylic acid isopropylester, (meth)acrylic acid n-butyl ester, (meth)acrylic acid sec-butyl ester, (meth)acrylic acid pentyl, (meth)acrylic acid hexyl, cyclohexyl methacrylate ester, (meth)acrylic acid heptyl, (meth)acrylic acid n-octyl ester, (meth)acrylic acid isooctylester, (meth)acrylic acid 2-ethylhexyl ester, (meth) acrylic acid decyl, (meth)acrylic acid isononyl ester, (meth) acrylic acid hydroxyethyl ester, (meth)acrylic acid iso myristyl ester, (meth)acrylic acid iso stearyl ester, (meth)acrylic acid stearyl ester, (meth)acrylic acid lauryl ester, glycydyl (meth)acrylate, 2-hydroxyethyl (meth)acrylate, (meth) acrylic acid n-butoxy ethyl, (meth)acrylic acid phenoxy ethyl, (meth)acrylic acid tetrahydro furfuryl, (meth)acrylic acid benzil, (meth)acrylic acid tribromophenyl, (meth) acrylic acid 2,3-dichloro propyl, ε-(poly)caprolactone acrylate and tetrahydrofuranyl acrylate.

Epoxy ester compounds such as urethane acrylate obtained by reaction of a compound having an isocyanate radical with a (meth)acrylic monomer having an active hydrogen, or an epoxy ester compound obtained by reaction of a compound having an epoxy group with acrylic acid or a (meth)acrylic monomer having a hydroxyl group; polyester acrylate; alkylene glycol mono(meth)acrylates, dialkylene glycol mono(meth)acrylates, polyalkylene glycol (meth)acrylates; alkylene glycol di(meth)acrylates, polyalkylene glycol di(meth)acrylates, glycerine mono(meth) acrylates, glycerine di(meth)acrylates and glycerine tri (meth)acrylates obtained by reaction of an alkylene glycol such as ethylene glycol or propylene glycol with acrylic acid; trimethylolalkane tri-(meth)acrylates; acrylamide; silicone acrylate; polybutadiene acrylate; ethylene oxide adduct dimethacrylates such as ethylene glycol dimethacrylate, diethylene glycol dimethacrylate, 1,4-butane diol dimethacrylate, 1,6-hexane diol dimethacrylate, 1,9-nonane diol dimethacrylate, trimethylolpropane, trimethacrylate, glycerine dimethacrylate, 2-hydroxy-3-acryloyloxypropylmethacrylate and bisphenol A; and trimethyloylpropane trimethacrylate, trimethylolpropane PO-modified trimethacrylate, trimethylolpropane EO-modified trimethylacrylate, pentaerythritol triacrylate, dipentaerythritol pentacrylate, dipentaerythritol hexacrylate, di-trimethylolpropane tetracrylate and pentaerythritol tetracrylate, can also be used.

Examples of other compounds having radical polymerizing double bonds are acrylic acid amino alkyl esters such as acrylic acid N,N-dimethylaminoethyl, acrylic acid N,N-diethylaminoethyl, acrylic acid N,t-butylaminoethyl; (meth) acrylonitrile; butadiene; isoprene; vinyl chloride; vinylidene chloride; vinyl acetate; vinyl ketone; N-vinylpyrrolidone; vinylpyridine; (meth)acrylamide and vinyl carbazole; divinylbenzene; α-methylstyrene, vinyltoluene, chlorostyrene, t-butylstyrene; vinyl ether monomers such as methyl vinyl ether, ethyl vinyl ether and isobutyl vinyl ether; fumaric acid; maleic acid; itaconic acid; phthalic acid; monoalkyl esters of fumaric acid, dialkyl esters of fumaric acid; monoalkyl esters of maleic acid, dialkyl esters of maleic acid; monoalkyl esters of itaconic acid, dialkyl esters of itaconic acid; and monoalkyl esters of phthalic acid, dialkyl esters of phthalic acid.

The polymer compound of this invention obtained as described above comprises an aromatic group having C, H and/or C, H, X in the side-chain. As this aromatic ring easily assumes a stack configuration, a hypochromic effect is produced, and the optical absorption coefficient due to this aromatic ring is 70% or less of the optical absorption coefficient due to the aromatic ring in the polymerizing monomer used to introduce the aromatic ring. Therefore, the polymer compound of this invention may be used as an ultra-violet light transmitting material and is useful as a light resistant polymer material. It also has application as a laser material or electroluminescent material by using excimer light emission. In particular, as it can also be made to emit excimer light from blue to ultraviolet, it has many industrial applications.

EXAMPLES

This invention will now be described in detail by way of examples and comparative examples, but this invention is not limited in any way thereby.

Examples 1-4

<Synthesis of Monomer>

Fluorene (30.1 g) (Wako Pure Pharmaceuticals), 100 g $AlCl_3$ (Wako Pure Pharmaceuticals) and 400 ml $CS_2$ were introduced to a four-neck 3 liter flask fitted with a mechanical stirrer and hydrogen chloride trap which had been flame-dried and filled with nitrogen, and stirred. Next, 64 ml valeroyl chloride (Wako Pure Pharmaceuticals) was slowly dripped in for 30 minutes, the reaction solution was stirred at room temperature for 8 hours, and slowly poured into a 2 liter Meyer flask containing ice with stirring to stop the reaction. After neutralizing with HCl, the organic layer was extracted twice using methylene chloride, the extracted organic layer was washed twice by a 2 wt % NaOH aqueous solution, washed once with saturated salt solution, and dried using $MgSO_4$. After drying with ethyl acetate, this solution was cerite filtered, and concentrated under reduced pressure to give 61 g of a brown, viscous liquid. After recrystallization, 52 g of a red solid was obtained. The compound so obtained was taken as Compound 1. The NMR spectrum of Compound 1 was as follows.

$^1$H-NMR (500 MHz, $CDCl_3$, $CHCl_3$) d 8.164 (s, 2H), 8.028 (d, J=8.0 Hz, 2H), 7.880 (d, J=8.0 Hz, 2H), 4.002 (s, 2H), 3.019 (t, J=7.5 Hz, 4H), 1.752 (quin, J=7.5 Hz, 4H), 1.435 (sex, J=7.5 Hz, 4H), 0.970 (t, J=7.5 Hz, 6H) $^{13}$C-NMR (125 Mz, $CDCl_3$, $CHCl_3$) d 200.289 144.798 136.420 127.484 124.837 120.617 38.534 36.931 26.592 22.494 13.948

A Dean-Stark trap with reflux condenser was fitted to a 1 liter conical flask, and 30.4 g of Compound 1, 44.2 g hydrazine monohydrate (Wako Pure Pharmaceuticals) and 400 ml diethylene glycol (Wako Pure Pharmaceuticals) were introduced and heated at 130° C. for 2 hours, then 20.6 g KOH (Wako Pure Pharmaceuticals) was added and heated at 200° C. for 3 hours. After returning the reaction liquid to room temperature, water was added to stop the reaction, and the organic layer was extracted twice with ether. The organic layer was washed with 1N-HCl, saturated sodium bicarbonate solution, water (twice) and a saturated salt solution in order, and dried using $MgSO_4$. The dried solution was filtered, and concentrated under reduced pressure to obtain 27.7 g of a yellow solid. From the solid obtained, 26.2 g of a white solid were obtained by silica gel chromatography (hexane). This was taken as Compound 2. The NMR spectrum of Compound 2 was as follows.

$^1$H-NMR (500 MHz, $CDCl_3$, $CHCl_3$) d 7.694 (d, J=7.5 Hz, 2H), 7.174 (d, J=7.5 Hz, 2H), 3.840 (s, 2H), 3.019 (t, J=7.5 Hz, 4H), 1.697-1.636 (m, 4H), 1.370-1.340 (m, 8H), 0.912 (t, J=7.0 Hz, 6H) $^{13}$C-NMR (125 Mz, $CDCl_3$, $CHCl_3$) d 143.326 141.220 139.419 126.897 124.989 119.220 36.695 36.115 31.575 31.521 22.586 14.055 Anal. Calcd for $C_{23}H_{30}$ C, 90.13; H, 9.87. Found; C, 90.40: H, 10.0.

Compound 2 (5.0 g), 280 ml toluene and 7.4 ml TMEDA were introduced to a three-neck 1 liter flask which had been flame-dried and filled with nitrogen, and stirred at 0° C. for 10 minutes.

n-BuLi/hexane (1.6M, 31 ml) (Wako Pure Pharmaceuticals) was dripped into this solution during 10 minutes, and stirred for 5 minutes. Paraformaldehyde (1.58 g) (Wako Pure Pharmaceuticals) and 20 ml toluene were added to the solution, stirred at 0° C. for 80 minutes, then water was added to the reaction solution to stop the reaction, and the organic layer was extracted twice with ethyl acetate. The extracted organic layer was washed with saturated salt solution, and dried using $MgSO_4$. The dried solution was filtered, and was concentrated under reduced pressure to obtain 8.5 g of a yellow liquid. From this liquid, 3.1 g of a pink solid were obtained by silica gel chromatography (hexane/ethyl acetate=15:1). This was taken as Compound 3. The NMR spectrum of Compound 3 was as follows.

$^1$H-NMR (500 MHz, $CDCl_3$, $CHCl_3$), d 7.6621 (d, J=7.5 Hz, 2H), 7.394 (s, 2H), 7.191 (d, J=8.0 Hz, 2H), 4.045 (s, 3H), 2.669 (t, J=7.5 Hz, 4H), 1.660 (quin, J=7.0 Hz, 4H), 1.363-1.334 (m, 8H), 0.901 (t, J=7.0 Hz, 6H) $^{13}$C-NMR (125 Mz, $CDCl_3$, $CHCl_3$) d 144.363 141.685 139.251 127.736 124.623 119.449 65.287 50.148 36.161 31.605 31.483 22.563 14.055

Compound 3 (1.62 g), 30 ml MeOH and 230 ml THF were introduced to a 200 ml conical flask fitted with a reflux condenser, and stirred at 0° C. for 10 minutes. t-BuOK (1.63 g) was introduced to the reaction solution, and after stirring for 5 minutes at the reflux temperature, water was added to stop the reaction. Next, the organic layer was extracted from the reaction liquid twice with hexane, the extracted organic layer was washed with saturated salt solution, and dried with $MgSO_4$. The dried solution was cerite filtered, and concentrated under reduced pressure to obtain 1.57 g of a yellow liquid. From this yellow liquid, 1.4 g of a yellow liquid was obtained by silica gel chromatography. This was taken as Compound 4.

Structural Formula of Compound 4:

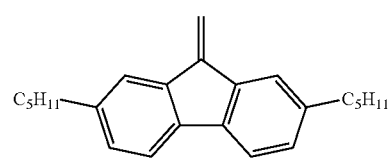

<Synthesis of Polymer>

A solution of 0.4 g of Compound 4 dissolved in 8 ml THF was introduced into an ampule which had been vacuum dried and filled with nitrogen, cooled to −78° C., then an amount of n-BuLi equal to ⅕ equivalents of Compound 4 was added, and reacted for 24 hours. After reaction, MeOH was added to stop the reaction. An equivalent amount of MeOH to that of the solution was added, and the precipitate obtained was recovered by centrifugal separation (0.38 g).

The polymer thus obtained was taken as Polymer 1. The number average molecular weight of this Polymer 1 was 1,000 (Example 1).

A polymer was synthesized in an identical way to that of Polymer 1, except that 1/10 equivalents of n-BuLi were added. The number average molecular weight of this Polymer 2 was 2,000 (Example 2).

A polymer was synthesized in an identical way to that of Polymer 1, except that 1/15 equivalents of n-BuLi were added. The number average molecular weight of this Polymer 2 was 3,000 (Example 3).

A polymer was synthesized in an identical way to that of Polymer 1, except that 1/25 equivalents of n-BuLi were added. The number average molecular weight of this Polymer 2 was 5,000 (Example 4).

Comparative Examples 1-4

<Synthesis of Monomer>

Fluorene (5.0 g), 280 ml toluene and 7.4 ml TMEDA were introduced to a three-neck 1 liter flask which had been flame-dried and filled with nitrogen, and stirred at 0° C. for 10 minutes.

n-BuLi/hexane (1.6M, 31 ml) (Wako Pure Pharmaceuticals) was dripped into this solution during 10 minutes, and stirred for 5 minutes. 1.58 g paraformaldehyde (Wako Pure Pharmaceuticals) and 20 ml toluene were added to the solution, stirred at 0° C. for 80 minutes, then water was added to the reaction solution to stop the reaction, and the organic layer was extracted twice with ethyl acetate. The extracted organic layer was washed with saturated salt solution, and dried using $MgSO_4$. The dried solution was filtered, and was concentrated under reduced pressure to obtain 8.5 g of a yellow liquid. From this liquid, 3.1 g of a pink solid were obtained by silica gel chromatography (hexane/ethyl acetate=15:1). This was taken as Compound 5.

Compound 5 (1.62 g), 30 ml MeOH and 230 ml THF were introduced to a 200 ml conical flask fitted with a reflux condenser, and stirred at 0° C. for 10 minutes. t-BuOK (1.63 g) was introduced to the reaction solution, and after stirring for 5 minutes at the reflux temperature, water was added to stop the reaction. Next, the organic layer was extracted from the reaction liquid twice with hexane, the extracted organic layer was washed with saturated salt solution, and dried with $MgSO_4$. The dried solution was cerite filtered, and concentrated under reduced pressure to obtain 1.57 g of a yellow liquid. From this yellow liquid, 1.4 g of a yellow liquid was obtained by silica gel chromatography. This was taken as Compound 6.

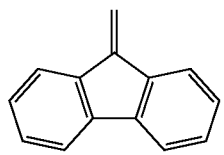

<Synthesis of Polymer>

A solution of 0.4 g of Compound 6 dissolved in 8 ml THF was introduced into an ampule which had been vacuum dried and filled with nitrogen, cooled to −78° C., then an amount of n-BuLi equal to 1/5 equivalents of Compound 6 was added, and reacted for 24 hours. MeOH was added to stop the reaction, then an equivalent amount of MeOH to that of the solution was added, and the precipitate obtained was recovered by centrifugal separation. The polymer thus obtained was taken as Polymer 5. The number average molecular weight of this Polymer 5 was 1,000 (Comparative Example 1).

A polymer was synthesized in an identical way to that of Polymer 1, except that 1/10 equivalents of n-BuLi were added. The number average molecular weight of this polymer 6 was 2,000 (Comparative Example 2).

A polymer was synthesized in an identical way to that of Polymer 1, except that 1/15 equivalents of n-BuLi were added. The number average molecular weight of this polymer 7 was 3,000 (Comparative Example 3).

A polymer was synthesized in an identical way to that of Polymer 1, except that 1/25 equivalents of n-BuLi were added. The number average molecular weight of this polymer 8 was 5,000 (Comparative Example 4).

Solubility in THF

The solubility was examined by adding 5 g of each of the above polymers 1-8 to 100 g THF, and stirring at room temperature for 1 hour. Table 1 shows the results. Polymers which dissolved completely are shown by O, those which dissolved slightly but left a residue are shown by Δ, and those which hardly dissolved at all are shown by X.

|  | Polymer compound | Solubility |
| --- | --- | --- |
| Example 1 | Polymer 1 | O |
| Example 2 | Polymer 2 | O |
| Example 3 | Polymer 3 | O |
| Example 4 | Polymer 4 | O |
| Comparative Example 1 | Polymer 5 | O |
| Comparative Example 2 | Polymer 6 | O |
| Comparative Example 3 | Polymer 7 | Δ |
| Comparative Example 4 | Polymer 8 | X |

The above results show that although the solubility of polymer compounds having a fluorene ring without a substituent group rapidly becomes poorer as the molecular weight increases, the solubility improves in the case where they have a fluorene ring with —$C_5H_{11}$ as a substituent group.

Example 5

Synthesis of Dibenzofulvene

9-Hydroxymethylfluorene (10 g) and 1 g KOH were dissolved in 90 ml of methanol and reacted at 60° C. for 1 hour, and the methanol was evaporated. From the solid thus obtained, dibenzofulvene was extracted using hexane and water, and washed with water until the hexane phase containing dibenzofulvene was neutral. After separating off the hexane phase, the hexane was evaporated, and the solid obtained was recrystallized from a mixed solvent of hexane-diethyl ether (4/6 v/v) to obtain dibenzofulvene. The melting point of the dibenzofulvene was 50-52° C.

The dibenzofulvene (0.5 mol) was dissolved in THF, and a polymer of dibenzofulvene was obtained by reacting at −78° C. for 24 hours, using 0.025 mol of n-BuLi as polymerization initiator. Subsequently, polymers from the dimer to the 17th homopolymer of dibenzofulvene were separated by GPC according to the degree of polymerization.

The molar extinction coefficient was measured by measuring the optical absorbance of a THF solution at room temperature (FIG. 1).

Measurement of Fluorescence Spectrum

The emission spectrum of a THF solution was measured using excitation light of 267 nm at room temperature (FIG. 2).

From the optical absorption spectrum, it was found that when the degree of polymerization was 3 or more, the molar extinction coefficient was approx. 40% less than the molar extinction coefficient at 265 nm of the monomer. This shows that the fluorene ring of this dibenzofulvene polymer adopts a stack configuration. In addition, the absorption edge shifted to 318 nm from the absorption edge of 306 nm of the monomer. Further, from measurement of the fluorescence spectrum, when the degree of polymerization was 4 or more, a light emission peak due to excimer light emission was observed at a wavelength of 400 nm (peak width 340-550 nm) which was different from the light emission peak wave length of 305 nm of the monomer (peak width 295 nm to 375 nm). This also shows that the fluorene ring in this dibenzofulvene polymer adopts a stack configuration.

Example 6 (Copolymerization)

<Synthesis of 2,7-di-t-butyl dibenzofulvene>

Fluorene (30.4764 g, 183.5928 mmol), $FeCl_3$ (0.5 eq., 14.7517 g) and $CS_2$ (300 ml) were introduced to a three-neck 1 liter flask fitted with a mechanical stirrer and hydrogen chloride trap which had been flame-dried and filled with nitrogen, and stirred. t-BuCl (2.5 eq., 50 ml) was dripped into this solution during 10 minutes. The reaction solution was stirred at room temperature for 7 hours, then water was added to quench the reaction. Next, the organic layer was extracted twice with methylene chloride, the extracted organic layer was washed with saturated salt solution, and dried using $MgSO_4$. The dried solution was filtered, and was concentrated under reduced pressure to give a crude product (49.4598 g, brown solid). This crude product was refined by silica gel column chromatography (hexane), and the target product 2,7-di-t-butylfluorene (43.6058 g, 85%, white solid) was thus obtained. For the reaction, no further purification was carried out, but for measurement of analysis data, a sample which had been recrystallized from EtOH was used.

Mp: 120.1-120.6° C.; $^1$H-NMR (500 MHz, $CDCl_3$, $CHCl_3$) δ: 7.68 (d, J=8.0 Hz, 2H), 7.58 (s, 2H), 7.41 (d, J=8.0 Hz, 2H), 3.88 (s, 2H), 1.40 (s, 18H); $^{13}$C-NMR (125 MHz, $CDCl_3$) δ: 149.42, 143.25, 139.12, 123.76, 121.84, 119.07, 37.08, 34.80, 31.62; IR (KBr): 2959, 2895, 2868, 1473, 1358, 1261, 1163, 817, 716 $cm^{-1}$; HRMS (EI) Calcd. for $C_{21}H_{26}$: 278.2034. Found: 278.2038.

2,7-Di-t-butylfluorene (10.0083 g, 36.9712 mmol), toluene (570 ml) and N,N,N',N'-tetramethylene diamine (17 ml) were introduced to a three-neck 1 liter flask which had been flame-dried and filled with nitrogen, and stirred at 0° C. for 10 minutes. A hexane solution (1.6M, 68 ml) of n-BuLi was dripped into this reaction solution during 10 minutes, and stirred for 5 minutes. Paraformaldehyde (3.2467 g) and toluene (30 ml) were added to the solution obtained, and stirred at 0° C. for 150 minutes, then the reaction solution was quenched with water, and the organic layer was extracted twice with ethyl acetate.

The organic layer obtained was washed with saturated sodium bicarbonate and saturated salt solution, and dried by magnesium sulfate. This solution was filtered, and concentrated under reduced pressure to obtain a crude product (21.0154 g, yellow liquid). This crude product was purified by silica gel chromatography (hexane/ethyl acetate=15:1), and 2,7-di-t-butyl-9-hydroxymethylfluorene (6.7477 g, 59%, light yellow solid) was isolated.

Mp: 101.5-103.0° C.; $^1$H-NMR (500 MHz, $CDCl_3$, TMS) δ: 7.64 (d, J=8.0 Hz, 2H), 7.61 (d, J=2.0 Hz, 2H), 7.34 (dd, J=8.0, 2.0 Hz, 2H), 4.06 (s, 3H), 1.54 (br s, 1H), 1.37 (s, 18H); $^{13}$C-NMR (125 MHz, $CDCl_3$) δ: 149.89, 144.29, 138.93, 124.66, 121.39, 119.26, 65.33, 50.47, 34.87, 31.61; IR (KBr): 3322, 2955, 2866, 1476, 1361, 1259, 1058, 817, 735 $cm^{-1}$. HRMS (EI) Calcd. for $C_{22}H_{28}O$: 308.2140. Found: 308.2138.

2,7-Di-t-butyl-9-hydroxymethylfluorene (2.0383 g, 6.6179 mmol), MeOH (40 ml), THF (40 ml) and t-BuOK (2.3048 g) were introduced in a 200 ml conical flask fitted with a reflux condenser, and stirred at reflux temperature for 10 minutes. The reaction solution was quenched with water, and the organic layer was extracted twice with hexane, washed with saturated salt solution, and dried by $MgSO_4$. The solution obtained was filtered, and concentrated under reduced pressure to obtain a crude product (1.8975 g, yellow solid). The crude product was purified by silica gel column chromatography (hexane), and 2,7-di-t-butyl dibenzofulvene (1.7840 g, 93%, yellow solid) was isolated.

Mp: 158.6-160.5° C.; $^1$H-NMR (500 MHz, $CDCl_3$, TMS) δ: 7.74 (d, J=1.0 Hz, 2H), 7.56 (d, J=8.0 Hz, 2H), 7.39 (dd, J=8.0, 2.0 Hz, 2H), 6.05 (s, 2H), 1.38 (s, 18H); $^{13}$C-NMR (125 MHz, $CDCl_3$) δ: 149.81, 144.02, 138.12, 137.70, 125.97, 119.04, 117.68, 106.47, 34.89, 31.52; IR (KBr): 2959, 1474, 1361, 1253, 1102, 888, 823, 754, 684 $cm^{-1}$; HRMS (EI) Calcd. for $C_{22}H_{26}$: 290.2034. Found: 290.2029. Anal. Calcd. for $C_{22}H_{20}$: C, 90.98. H, 9.02. Found: C, 91.02. H, 9.07.

<Synthesis of Soluble N-stack Polymer by Copolymerization of 2,7-di-t-butyl dibenzofulvene>

2,7-Di-t-butyl dibenzofulvene (499.6 mg, 1.7202 mmol), a THF solution (0.87M, 1.8 ml) of DBF and THF (3.9 ml) were introduced into an ampule which had been flame-dried and filled with nitrogen. The reaction solution was cooled to −78° C., a hexane solution (1.6M, 0.05 ml) of n-BuLi was added to start the polymerization, and polymerization was continued at −78° C. for 24 hours. After 24 hours, MeOH (0.2 ml) was added to the reaction solution at this temperature to stop the polymerization. The reaction mixture was added to $CDCl_3$, the $^1$H-NMR was measured, and the conversion ratio of monomer was found using the solvent as an internal reference (monomer conversion ratio: DBF→99%, 2,7-t-butyl dibenzofulvene=6%). The solvent was removed from the reaction solution, and the residue divided into a THF insoluble fraction (117.6 mg, 15%) and soluble fraction. MeOH was added to the THF soluble fraction to reprecipitate it, and a MeOH insoluble fraction (156.0 mg, 20%) was obtained.

Fraction which is Soluble in THF but Insoluble in MeOH:

Molecular weight, Mn=7900, Mw/Mn=1.13 [GPC, vs. polystyrene]; Absorption spectrum, ε=22792 (222 nm), ε=10714 (264 nm), hypochromic rate 49% (264 nm) [THF, 23° C.] [Reference data (monomer unit model, 2,7-di-t-butylfluorene): ε=28988 (222 nm), ε=26477 (264 nm)] [Reference data (monomer unit model, fluorene): ε=19638 (222 nm), ε=20486 (264 nm); Emission spectrum, $\lambda_{max}$=397 nm [$\lambda_{Ex.}$=265 nm, THF, 23° C.] [Reference data (monomer unit model, 2,7-di-t-butylfluorene) $\lambda_{max}$=311 nm] [Reference data (monomer unit model, fluorene), $\lambda_{max}$=311 nm]

Example 7 (Polymer 1 with Substituent in Side-chain)

<Synthesis of 2,7-di-n-pentyl dibenzofulvene>

Fluorene (30.0855 g, 181.2380 mmol), AlCl$_3$ (100.1639 g) and CS$_2$ (400 ml) were introduced to a four-neck 3 liter flask fitted with a mechanical stirrer and hydrogen chloride trap which had been flame-dried and filled with nitrogen, and stirred. Valeroyl chloride (64 ml) was slowly dripped in for 30 minutes. During this process, a large amount of hydrogen chloride gas was generated. The reaction solution obtained was stirred at room temperature for 8 hours, and quenched by slowly pouring it into a 2l Meyer flask containing ice with stirring. The organic layer was extracted twice using methylene chloride, the organic layer was washed twice by a 2 wt % NaOH aqueous solution, washed once with saturated salt solution, and dried by MgSO$_4$. Next, this organic layer solution was cerite filtered, and concentrated under reduced pressure to give a crude product (61.0123 g, brown solid). The crude product was recrystallized from ethyl acetate to obtain 2,7-di(1-oxopentyl)fluorene (52.4458 g, 87%, red solid).

Mp: 147.3-149.1° C.; $^1$H-NMR (500 MHz, CDCl$_3$, TMS) δ: 8.18 (s, 2H), 8.04 (d, J=8.0 Hz, 2H), 7.90 (d, J=8.0 Hz, 2H), 4.02 (s, 2H), 3.03 (t, J=7.0 Hz, 4H), 0.76 (quin, J=7.0 Hz, 4H), 1.44 (sex, J=7.0 Hz, 4H), 0.98 (t, J=7.0 Hz, 6H); $^{13}$C-NMR (125 MHz, CDCl$_3$) δ: 200.29, 144.77, 144.46, 136.44, 127.43, 124.81, 120.59, 38.51, 36.92, 26.58, 22.49, 13.93; IR (KBr): 2957, 2937, 2895, 2870, 1680, 1605, 1213, 1137, 843, 798, 754, 731 cm$^{-1}$; HRMS (EI) Calcd. for C$_{23}$H$_{26}$O$_2$: 334.1933. Found: 334.1933.

A Dean-Stark trap with reflux condenser was fitted to a 1 liter conical flask, and 2,7-di(1-oxopentyl)fluorene (30.4129 g, 91.0566 mmol), hydrazine monohydrate (44.2 ml) and diethylene glycol (400 ml) were introduced and heated at 130° C. After 2 hours, KOH (20.5628 g) was added and heated at 200° C. After 3 hours, the reaction liquid was returned to room temperature, water was added, and the organic layer was extracted twice with ether. The organic layer was washed with 1N-HCl, saturated sodium bicarbonate solution, water (twice) and a saturated salt solution, and dried using MgSO$_4$. The solution obtained was filtered, and concentrated under reduced pressure to obtain a crude product (27.6591 g, yellow solid). The crude product was purified by silica gel chromatography (hexane) to obtain 2,7-di-n-pentylfluorene (26.2137 g, yellow solid).

Mp: 98.9-99.6° C.; $^1$H-NMR (500 MHz, CDCl$_3$, TMS) δ: 7.63 (d, J=8.0 Hz, 2H), 7.33 (s, 2H), 7.16 (d, J=8.0 Hz, 2H), 3.83 (s, 2H), 2.67-2.64 (m, 4H), 1.68-1.62 (m, 4H), 1.53-1.33 (m, 8H), 0.91-0.88 (m, 6H); $^{13}$C-NMR (125 MHz, CDCl$_3$) δ: 143.33, 141.24, 139.43, 126.91, 124.80, 119.23, 36.70, 36.12, 31.56, 31.51, 22.59, 14.06; IR (KBr): 2953, 2925, 2870, 2855, 1467, 1420, 2397, 864, 811 cm$^{-1}$; HRMS (EI) Calcd. for C$_{23}$H$_{30}$: 306.2348. Found: 306.2339; Anal. Calcd. for C$_{23}$H$_{30}$: C, 90.13. H, 9.87. Found: C, 90.40, H, 10.0.

2,7-Di-n-pentylfluorene (5.0407 g, 16.4727 mmol), toluene (280 ml) and N,N,N',N'-tetramethylene diamine (17 ml) were introduced to a three-neck 1 liter flask which had been flame-dried and filled with nitrogen, and stirred at 0° C. for 10 minutes. A hexane solution (1.6M, 68 ml) of n-BuLi was dripped into this reaction solution during 10 minutes, and stirred at this temperature for 5 minutes. Paraformaldehyde (1.5844 g) and toluene (20 ml) were added to the solution obtained, and stirred at 0° C. for 80 minutes. The reaction solution was quenched with water, and the organic layer was extracted twice with ethyl acetate. The extracted organic layer was washed with saturated sodium bicarbonate and saturated salt solution, dried by magnesium sulfate, filtered, and concentrated under reduced pressure to obtain a crude product (8.5301 g, yellow liquid). This crude product was purified by silica gel chromatography (hexane/ethyl acetate=15:1), and 9-hydroxymethyl-2,7-di-n-pentylfluorene (3.1360 g, 57%, pink solid) was isolated.

Mp: 61.3-63.7° C.; $^1$H-NMR (500 MHz, CDCl$_3$, TMS) δ: 7.62 (d, J=8.0 Hz, 2H), 7.39 (s, 2H), 7.19 (d, J=8.0 Hz, 2H), 4.05 (s, 3H), 2.68-2.65 (m, 4H), 1.69-1.63 (m, 4H), 1.51 (br s, 1H), 1.36-1.33 (m, 8H), 0.91-0.89 (m, 6H); $^{13}$C-NMR (125 MHz, CDCl$_3$) δ: 144.36, 141.69, 139.25, 127.74, 124.62, 119.45, 65.29, 50.15, 36.16, 31.61, 31.48, 22.56, 14.06; IR (KBr): 3311, 2926, 2855, 1467, 1418, 1062, 023, 896, 809, 732 cm$^{-1}$; HRMS (EI) Calcd. for C$_{24}$H$_{32}$O: 336.2453. Found: 336.2446.

9-Hydroxymethyl-2,7-di-n-pentylfluorene (1.6210 g, 4.8171 mmol), MeOH (30 ml) and THF (230 ml) were introduced in a 200 ml conical flask fitted with a reflux condenser, and stirred at 0° C. for 10 minutes. t-BuOK (1.6330 g) was added to the reaction solution at this temperature, and stirred at reflux temperature for 5 minutes. Next, water was added to the reaction solution to quench, the organic layer was extracted twice with hexane, washed with saturated salt solution, and dried by MgSO$_4$. This solution was cerite filtered, and concentrated under reduced pressure to obtain a crude product (1.5743 g, yellow liquid). The crude product was purified by silica gel column chromatography (hexane), and 2,7-di-n-pentyl dibenzofulvene (1.4020 g, 91%, yellow liquid) was obtained. As this compound starts polymerizing when left as an oil without a solvent at room temperature, it was rapidly extracted and purified by column chromatography and used for polymerization.

$^1$H-NMR (500 MHz, CDCl$_3$, CHCl$_3$) δ: 7.56 (d, J=8.0 Hz, 2H), 7.54 (s, 2H), 7.19 (d, J=8.0 Hz, 2H), 6.05 (s, 2H), 2.71-2.68 (m, 4H), 1.72-1.66 (m, 4H), 1.39-1.37 (m, 8H), 0.95-0.92 (m, 6H); $^{13}$C-NMR (125 MHz, CDCl$_3$) δ: 143.66, 141.59, 138.28, 138.06, 128.98, 120.90, 119.17, 106.81, 36.16, 31.54, 31.40, 22.57, 14.04; IR (neat) 2929, 2855, 1465, 1376, 1298, 889, 817, 754 cm$^{-1}$. HRMS (EI) Calcd. for C$_{24}$H$_{30}$: 318.2348. Found: 318.2363.

<Synthesis of Soluble N-stack Polymer by Polymerization of 2,7-di-n-pentyl dibenzofulvene>

A dry hexane solution of 2,7-di-n-pentyl dibenzofulvene (0.97M, 1.65 ml, 1.60 mmol) was introduced to an ampule which had been flame-dried and filled with nitrogen, and hexane was distilled off under reduced pressure. Dry THF (2.6 ml) was added to dissolve the monomer, and the solution was cooled to −78° C. A hexane solution (1.6M, 0.1 ml) of n-BuLi was added to start the polymerization, and polymerization was continued for 24 hours. MeOH (0.2 ml) was added while the reaction solution was kept at −78° C. to stop the polymerization. Part of the reaction mixture was diluted with CDCl$_3$, the $^1$H-NMR was measured, and from the intensity ratio of the peak of the solvent used as internal reference to the absorption of the vinyl protons in the remaining monomer, the monomer conversion ratio was determined (monomer conversion ratio: >99%).

The solvent was distilled off from the reaction solution, the crude product obtained was dissolved in THF, and reprecipitated by MeOH to obtain a MeOH insoluble fraction (320.8 mg, 62%).

MeOH Insoluble Fraction

Molecular weight, Mn=3100, Mw/Mn=1.24 [GPC, vs. polystyrene]; Absorption spectrum, ε=12751 (282 nm), ε=12701 (274 nm), hypochromic rate 55% (274 nm) [THF, 25° C.] [Reference data (monomer unit model, 2,7-di-n-pentylfluorene): ε=20436 (282 nm), ε=28315 (274 nm) [THF, r.t.]; Emission spectrum, $\lambda_{max}$=404 nm [$\lambda_{Ex.}$=282 nm, THF, r.t.] [Reference data (monomer unit model, 2,7-di-n-pentylfluorene) $\lambda_{max}$=315 nm] (Ex.=282 nm, THF, r.t.]. Solubility: soluble in toluene, chloroform and THF.

Example 8 (Polymer 2 with Substituent Group in Side-chain)

2,7-Dibromofluorene (25.1251 g, 77.5442 mmol), NiCl$_2$dppp (4.2480 g) and Et$_2$O (300 ml) were introduced to a three-neck 1 liter flask fitted with a dropping funnel which had been flame-dried and filled with nitrogen, and stirred at 0° C. for 15 minutes. An Et$_2$O solution of 3-methylpropyl magnesium bromide (1.53M, 302 ml) was added to the reaction solution, stirred at 0° C. for 10 minutes, and stirred at room temperature for 40 hours. The reaction solution was quenched by slowly pouring it into a 2 liter Meyer flask containing ice with stirring and extracted twice with ethyl acetate, the organic layer was washed by saturated sodium bicarbonate solution and saturated salt solution, and dried by anhydrous MgSO$_4$. This solution was cerite filtered, and concentrated under reduced pressure to give a crude product (22.3459 g, brown solid). The crude product (17.2926 g) was filtered by silica gel column chromatography (hexane), and this was divided into an EtOH soluble fraction (16.9854 g) and insoluble fraction (0.3072 g). The EtOH soluble fraction was recrystallized from EtOH to obtain 2,7-di(2-methylpropyl)fluorene (5.6111 g, 26%, light yellow solid).

Mp: 76.0-77.5; $^1$H-NMR (500 MHz, CDCl$_3$, CHCl$_3$) δ: 7.65 (d, J=8.0 Hz, 2H), 7.31 (s, 2H), 7.13 (d, J=8.0 Hz, 2H), 3.84 (s, 2H), 2.54 (t, J=7.0 Hz, 4H), 1.87-1.95 (m, 2H), 0.93 (d, J=7.0 Hz, 12H); $^{13}$C-NMR (125 MHz, CDCl$_3$) δ: 143.18, 139.99, 139.47, 127.62, 125.69, 119.07, 45.62, 36.70, 30.48, 22.41; IR (KBr): 2950, 2922, 2866, 1465, 839, 800, 745, 703 cm$^{-1}$; HRMS (EI) Calcd. for C$_{21}$H$_{26}$: 278.2034. Found: 278.2029.

A Dean-Stark trap with reflux condenser was fitted to a 1 liter conical flask, and 2,7-di(1-oxopentyl)fluorene (30.4129 g, 91.0566 mmol), hydrazine monohydrate (44.2 ml) and diethylene glycol (400 ml) were introduced and heated at 130° C. After 2 hours, KOH (20.5628 g) was added and heated at 200° C. After 3 hours, the reaction liquid was returned to room temperature, water was added, and the organic layer was extracted twice with ether. The organic layer was washed with 1N-HCl, saturated sodium bicarbonate solution, water (twice) and a saturated salt solution, and dried using MgSO$_4$. The solution obtained was filtered, and concentrated under reduced pressure to obtain a crude product (27.6591 g, yellow solid). The crude product was purified by silica gel chromatography (hexane) to obtain 2,7-di-n-pentylfluorene (26.2137 g, yellow solid).

Mp: 98.9-99.6° C.; $^1$H-NMR (500 MHz, CDCl$_3$, TMS) δ: 7.63 (d, J=8.0 Hz, 2H), 7.33 (s, 2H), 7.16 (d, J=8.0 Hz, 2H), 3.83 (s, 2H), 2.67-2.64 (m, 4H), 1.68-1.62 (m, 4H), 1.53-1.33 (m, 8H), 0.91-0.88 (m, 6H); $^{13}$C-NMR (125 MHz, CDCl$_3$) δ: 143.33, 141.24, 139.43, 126.91, 124.80, 119.23, 36.70, 36.12, 31.56, 31.51, 22.59, 14.06; IR (KBr): 2953, 2925, 2870, 2855, 1467, 1420, 2397, 864, 811 cm$^{-1}$; HRMS (EI) Calcd. for C$_{23}$H$_{30}$: 306.2348. Found: 306.2339; Anal. Calcd. for C$_{23}$H$_{30}$: C, 90.13. H, 9.87. Found: C, 90.40, H, 10.0.

2,7-Di-(2-methylpropyl)fluorene (10.0194 g, 35.9853 mmol), toluene (600 ml) and N,N,N',N'-tetramethylene diamine (16.3 ml) were introduced to a two-neck 2 liter flask which had been flame-dried and filled with nitrogen, and stirred at 0° C. for 15 minutes. A hexane solution (1.6M, 68 ml) of n-BuLi was dripped into this reaction solution, and stirred for 5 minutes. Next, paraformaldehyde (3.3552 g) was added to this solution, stirred at 0° C. for 70 minutes and quenched with water, and the organic layer was extracted twice with ethyl acetate. This organic layer was washed with saturated salt solution, dried by MgSO$_4$, filtered, and concentrated under reduced pressure to obtain a crude product (25.1026 g, yellow liquid). This crude product was purified by silica gel chromatography (hexane/ethyl acetate=20:1), and the target product, 9-hydroxymethyl-2,7-di-(2-methylpropyl)fluorene (6.3921 g, 58%, white solid) was thus obtained.

Mp: 104.6-105.4° C.; $^1$H-NMR (500 MHz, CDCl$_3$, CHCl$_3$) δ: 7.63 (d, J=8.0 Hz, 2H), 7.63 (s, 2H), 7.16 (d, J=8.0 Hz, 2H), 4.07-4.04 (m, 3H), 2.55 (d, J=7.0 Hz, 4H), 1.94-1.86 (m, 2H), 1.50-1.48 (m, 1H), 0.94-0.92 (m, 12H); $^{13}$C-NMR (125 MHz, CDCl$_3$) δ: 144.25, 140.44, 139.30, 128.48, 125.34, 119.30, 65.35, 50.16, 45.63, 30.46, 22.42, 22.38; IR (KBr): 3347, 2952, 2922, 1467, 1059, 1025, 887, 838, 791, 636 cm$^{-1}$; HRMS (EI) Calcd. for C$_{22}$H$_{28}$O: 308.2140. Found: 308.2139.

9-Hydroxymethyl-2,7-di-methylpropylfluorene (4.0273 g, 13.0563 mmol), MeOH (50 ml) and THF (50 ml) were introduced in a 200 ml conical flask fitted with a reflux condenser, and stirred at 0° C. for 10 minutes. t-BuOK (4.4273 g) was added to the reaction solution at this temperature, stirred at reflux temperature for 10 minutes and quenched with water. The organic layer was extracted twice with hexane, washed with saturated salt solution, and dried by MgSO$_4$. Next, the solution was cerite filtered, and concentrated under reduced pressure to obtain a crude product (3.7852 g, yellow solid). The crude product was purified by silica gel column chromatography (hexane), and 2,7-di-(2-methylpropyl) dibenzofulvene (3.5023 g, 92%, light yellow solid) was obtained.

Mp: 71.9-73.7° C.; $^1$H-NMR (500 MHz, CDCl$_3$, CHCl$_3$) δ: 7.54 (d, J=8.0 Hz, 2H), 7.49 (s, 2H), 7.14 (d, J=8.0 Hz, 2H), 6.02 (s, 2H), 2.54 (d, J=7.0 Hz, 4H), 1.96-1.88 (m, 2H), 0.94 (d, J=7.0 Hz, 12H); $^{13}$C-NMR (125 MHz, CDCl$_3$) δ: 143.68, 140.39, 138.17, 138.11, 129.71, 121.58, 119.03, 106.81, 45.65, 30.42, 22.38; IR (KBr): 2947, 1463, 1427, 896, 833, 801, 754, 667 cm$^{-1}$; HRMS (EI) Calcd. for C$_{22}$H$_{26}$: 290.2034. Found: 290.2028.

<Synthesis of Soluble N-stack Polymer by Polymerization of 2,7-di-isobutyl dibenzofulvene>

2,7-Di-isobutyldibenzofulvene (233 mg, 0.80 mmol) was dissolved in dry toluene (1.3 ml) in an ampule which had been flame-dried and filled with nitrogen. The solution was cooled to −78° C., n-BuLi (1.6M, 0.05 ml) was added to start the polymerization, and polymerization was continued for 24 hours. MeOH (0.2 ml) was added while the reaction solution was kept at −78° C. to stop the polymerization. Part of the reaction mixture was diluted with CDCl$_3$, the $^1$H-NMR was measured, and from the intensity ratio of the peak of the solvent used as internal reference to the absorption of the vinyl protons in the remaining monomer, the monomer conversion ratio was determined (monomer conversion ratio: >99%).

The solvent was distilled off from the reaction solution, the crude product obtained was dissolved in THF, and reprecipitated by MeOH to obtain a MeOH insoluble fraction (210.7 mg, 89%).

MeOH Insoluble Fraction

Molecular weight, Mn=3150, Mw/Mn=1.17 [GPC, vs. polystyrene]; Absorption spectrum, ε=11486 (294 nm), ε=10813 (274 nm), hypochromic rate 64% (264 nm) [THF, 25° C.] [Reference data (monomer unit model, 2,7-isobutylfluorene): ε=7075 (294 nm), ε=30021 (274 nm) [THF, r.t.]; Emission spectrum, $\lambda_{max}$=405 nm [$\lambda_{Ex.}$=294 nm, THF, r.t.] [Reference data (monomer unit model, 2,7-isobutylfluorene): $\lambda_{max}$=315 nm] [Ex.=294 nm, THF, r.t.]. Solubility: soluble in toluene, chloroform and THF.

Example 9 (Energy Transfer)

<Synthesis of Polydibenzofulvene Having a 1-pyrenyloxy Group in Start Terminal>

THF (0.97 ml) was introduced into an ampule which had been flame dried and filled with dry nitrogen, 1-pyrenyl methoxy potassium THF solution (0.4M, 2.5 ml) was added at −78° C., and DBF THF solution (0.654M, 1.53 ml) was dripped in to start the polymerization. The 1-pyrenyl methoxy potassium THF solution was prepared by introducing 1-pyrenyl methanol (464.6 mg, 2.0 mmol) and potassium hydroxide (81.3 mg, 2.0 mmol) into an ampule which had been flame dried and filled with dry nitrogen, adding THF (4.5 ml), and leaving at room temperature for 10 minutes. The reaction mixture was added to CDCl$_3$, the $^1$H-NMR was measured, and the monomer conversion ratio was found using the solvent as internal reference (monomer conversion ratio: after 24 hours, >99%). After polymerization at −78° C. for 24 hours, methanol (1.0 ml) was added to the reaction mixture to stop the polymerization. Approx. 50 ml THF was added to the reaction mixture, and the mixture divided into a THF soluble fraction (313 mg, 60 mg after subtracting residual initiator, 27%) and an insoluble fraction (164 mg, 73%). The THF soluble fraction was purified by aliquot GPC to obtain a polydibenzofulvene having a 1-pyrenyl methoxy group in the start terminal (GPC [Mn=1522, Mw/Mn=1.06]; end-group determination of $^1$H-NMR [Mn=3066]).

<Measurement of Energy Transfer Efficiency>

A light emission due only to the pyrenyl group was observed in the fluorescence spectrum of the polydibenzofulvene having a 1-pyrenyl methoxy group in the start terminal (in THF, nitrogen bubbling for 10 minutes, room temperature, exciting light 287 nm, concentration 7.50M), and the fluorescent yield ΦFL was 0.43 (standard sample: 9,10-diphenylanthracene ($\Phi_{FL}$=0.90)). Assuming that the value of the fluorescent yield does not vary regardless of the excitation method, and the fluorescent yield of the pyrenyl group at the end of the polydibenzo fulvene having a 1-pyrenyl methoxy group at the start end coincided with the fluorescent yield of 1-pyrenyl methanol ($\Phi_{FL}$=0.49, measured by the same method as for poly dibenzofulvene), the energy transfer efficiency $\Phi_{ET}$ was calcuated ($\Phi_{ET}$=0.86).

Example 10 (Conductivity: Time of Flight Measurement of Soluble Oligomer)

2,4,7-Trinitrofluorene malononitrile (1%) was added to and dissolved in a CH$_2$Cl$_2$ solution of a mixture of polymers having polymerization degrees of approx. 2-20 (main component was dimer- to 5th homopolymer). The solution was cast on an ITO glass plate, and dried to give a thin film (1 μm thickness). Aluminum was then vapor deposited on this thin film (thickness 1000 A, area 5 mm×5 mm). Using TOF301 (Optel Co., Ltd.), a voltage of 5.0V was applied between ITO and aluminum, pulsed laser light of 337 nm was simultaneously irradiated from the ITO side (nitrogen laser, pulse width 1 ns, 150 μJ), and the time of flight was measured. From the measurement results at room temperature, the hole migration was determined to be 1.02×10$^{-4}$ cm$^2$V$^{-1}$ sec$^{-1}$.

Example 11 (Conductivity: Electrical Resistance Measurement)

A polymer insoluble in solvents having a degree of polymerization of approx. 20 was kneaded with 2,4,7-trinitrofluorene malononitrile (TNFMN) in a mortar, and compression molding was then performed to give a film of approx. 0.2 mm thickness using a table press. This was fixed on a glass plate using epoxy adhesive, aluminum electrodes of width 5 mm and thickness 1000 A were vapor deposited with an inter-electrode distance of 90 μm, an alternating current voltage of 10 mV was applied in a dark location, and the electrical conductivity was measured. As a result, when the doping amount of TNFMN was 0.1%, a value of 4.29×10$^{-6}$ S/cm was obtained, and when the doping amount of TNFMN was 1%, a value of 1.13×10$^{-5}$ S/cm was obtained. Also, the electrical resistance was a non-ohmic resistance pattern and a threshold was observed between 5-7 v, so the material clearly had semiconductor properties.

Example 12 (Monocrystal Structural Analysis: Demonstration of N-stack Structure)

<Synthesis, Isolation, Single Crystal Preparation and Structural Analysis of Dibenzofulvene Hexamer Having Methyl Group at Start End, and Ethyl Group at Stop End>

THF (33.1 ml) was introduced into an ampule which had been flame dried and filled with dry nitrogen, methyllithium THF solution (1.0M, 2 ml) was added at −78° C., and a THF solution of DBF (0.67M, 14.9 ml) was dripped in to start the polymerization. The reaction mixture was added to CDCl$_3$, the $^1$H-NMR was measured, and the monomer conversion ratio was found using the solvent as internal reference (monomer conversion ratio: after 48 hours, 84%). After carrying out the polymerization at −78° C. for 48 hours, ethane iodide (2.0 ml, 25 mmol) was added to the reaction mixture to stop the polymerization. Approx. 50 ml THF was added to the reaction mixture, the mixture divided into a THF soluble fraction (758 mg, 98%) and insoluble fraction (15 mg, 2%), and the THF soluble fraction separated by recycle aliquot GPC to obtain a hexamer (MALDI-Mass mass number M/z=1135.25, calculated value 1136.46). From $^1$H-NMR, it was found that the hexamer had six fluorene units each having a methyl group and an ethyl group. This was recrystallized from chloroform to give 1 mm×1 mm×1 mm colorless, transparent single crystals (crystal cell constant a=10.402 A; b=19.7052 A; c=29.916 A; b=92.6521°: Space group P21/n: R=0.097, Rw=0.145). From crystal analysis, it was found that the spacing of aromatic rings was 0.37-0.46 nm (FIG. 3).

INDUSTRIAL FIELD OF APPLICATION

The polymer compound of this invention may be used as an ultra-violet light transparent material, and is useful as a light resistant polymer material. It may also have application as a laser material and electroluminescent material by using excimer light emission. In particular, as it can be made to emit excimer light from blue to ultraviolet, it has wide-ranging potential in industrial applications.

What is claimed is:

1. A polymer compound of formula I, having a functional group comprising a cyclic ring with aromatic properties, said functional group comprising C and H and/or C, H, and X, in a side-chain, said polymer compound having a number average molecular weight of 250-1,000,000, said polymer compound having a molar extinction coefficient due to a cyclic part having these aromatic properties of 30% or more lower than a molar extinction coefficient due to the cyclic part having said aromatic properties in a polymerizing monomer used to introduce the cyclic part having said aromatic properties, wherein in formula I Ar is a cyclic ring having aromatic properties, and may form a heterocyclic ring, $R^1$ and $R^2$, are hydrogen atoms, alkyl groups, —OR, aromatic groups, —NRR', halogen,

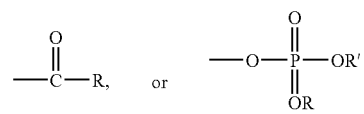

$R^5$ and $R^6$ are hydrogen atoms, alkyl groups, aromatic groups, —CN or ester groups R, R' are H or alkyl groups having 1-50 carbon atoms, X is not present, or is
—CH$_2$—, —CH$_2$—CH$_2$—, —CH=CH—, —C(=O)— or a hetero atom, and m is 2 or more, said polymer compound having optical properties

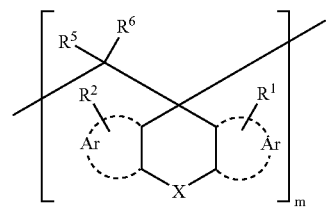

2. The polymer compound having optical properties according to claim 1, wherein said number average molecular weight is 250-10,000.

3. The polymer compound having optical properties according to claim 1, wherein said functional group comprising a cyclic part having aromatic properties in a side-chain is fluorene or a derivative thereof.

4. The polymer compound having optical properties according to claim 1, wherein the position of the light absorption peak due to the cyclic part having said aromatic properties is within the range 200 nm to 400 nm.

5. The polymer compound having optical properties according to claim 1, wherein the cyclic part having said aromatic properties in the side-chain has a stack structure.

6. The polymer compound having optical properties according to claim 1, wherein the interplane distance between cyclic parts having aromatic properties is 0.5 nm or less.

7. The polymer compound having optical properties according to claim 1, wherein the polymer compound having particular optical properties has a light emission wavelength which is different from the light emission wavelength of the monomer forming the polymer compound.

8. The polymer compound having optical properties according to claim 7, wherein the light emission of said polymer is excimer light emission.

9. The polymer compound having optical properties according to claim 8, wherein the cyclic part having said aromatic properties in the side-chain has a stack structure.

10. A polymerizing monomer of formula (1) used to synthesize the polymer compound of claim 1,

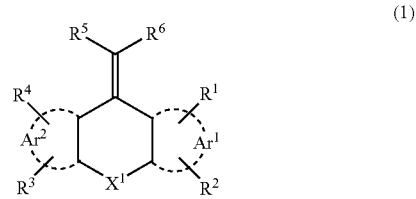

wherein $R^1$, $R^2$, $R^3$, $R^4$ are substituent groups selected from among hydrogen atoms, alkyl groups, —OR, aromatic groups, —NRR', —SR, halogen,

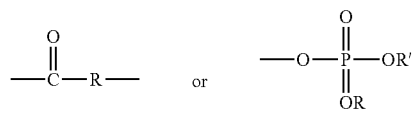

wherein these may be identical or different, $X^1$ is not present whereby atoms at both ends are directly bonded together, or is —CH$_2$—, —CH$_2$—CH$_2$—, —CH=CH—, —CO—, —S—, —O—, —Si(R)(R')—, —NR— or —N(COR)—, $R^5$ and $R^6$ are hydrogen atoms, alkyl groups, aromatic groups, -CN or ester groups, and may be identical or different, R and R' are H or alkyl groups having 1-50 carbon atoms, $Ar^1$ and $Ar^2$ are cyclic, having aromatic properties, and may form heterocyclic rings, and $Ar^1$ and $Ar^2$ may further be identical or different.

11. The polymerizing monomer according to claim 10, wherein $X^1$ is not present whereby atoms at both ends are directly bonded together, or is —CH$_2$—, —CH$_2$—CH$_2$— or —CH=CH—, and $Ar^1$ and $Ar^2$ are benzene rings.

12. The polymerizing monomer according to claim 10, wherein $X^1$ is S—, —O—, —Si(R)(R')—, —NR— or —N(COR)—, and $Ar^1$ and $Ar^2$ are benzene rings, wherein R and R' are alkyl groups having 1-5 carbon atoms.

13. A composition wherein an electron-acceptor compound or electro-donor compound is added to the polymer compound having particular optical properties described in claim 1.

14. The composition according to claim 13, wherein said composition is a charge transfer complex.

15. A charge transport material comprising the composition described in claim 14.

* * * * *